United States Patent [19]

Hanson et al.

[11] E Re. 28,785

[45] Reissued Apr. 20, 1976

[54] FONT STRIP STRUCTURE

[75] Inventors: Ellis P. Hanson, Jaffrey, N.H.; George J. H. Sausele, Lynnfield, Mass.

[73] Assignee: Compugraphic Corporation, Wilmington, Mass.

[22] Filed: Oct. 8, 1974

[21] Appl. No.: 513,051

Related U.S. Patent Documents

Reissue of:

[64] Patent No.: 3,710,707
Issued: Jan. 16, 1973
Appl. No.: 184,357
Filed: Sept. 28, 1971

U.S. Applications:

[62] Division of Ser. No. 804,466, March 5, 1969, Pat. No. 3,610,121.

[52] U.S. Cl. ..... 354/292; 101/415.1; 354/15

[51] Int. Cl.[2] ..... G03B 15/00

[58] Field of Search ..... 354/292, 12–16, 354/341, 342, 344, 345; 101/415.1

[56] References Cited

UNITED STATES PATENTS

| | | | |
|---|---|---|---|
| 2,375,603 | 5/1945 | Willard | 101/415.1 |
| 2,641,183 | 6/1953 | Boyajean, Jr. | 101/415.1 |
| 3,295,443 | 1/1967 | Devon | 101/415.1 X |
| 3,303,764 | 2/1967 | Kudlicki et al. | 354/16 |
| 3,336,849 | 8/1967 | Broglio | 95/4.5 |
| 3,485,150 | 12/1969 | Tortorici et al. | 354/15 X |

*Primary Examiner*—Richard A. Wintercorn
*Attorney, Agent, or Firm*—Watson, Cole, Grindle & Watson

[57] ABSTRACT

The font strip consists of a dimensionally stable photographic film on which have been developed timing marks and type characters. The font strip is accurately positioned on a rotating drum by guide posts which project through apertures on the font strip. The font strip is secured to the surface of the drum by the engagement of an end plate fastened to one end of the font strip, which end plate projects through pins mounted to the surface of the drum. The other end of the font strip is bent within a hooked end plate which engages a correspondingly tapered hook portion of the font drum. A tensioning mechanism associated with the font drum affords the necessary tension to maintain the font strip on the drum.

12 Claims, 3 Drawing Figures

INVENTORS,
ELLIS P. HANSON
GEORGE J. H. SAUSELE
BY Watson, Cole, Grindle & Watson
ATTORNEYS

FONT STRIP STRUCTURE

Matter enclosed in heavy brackets [ ] appears in the original patent but forms no part of this reissue specification; matter printed in italics indicates the additions made by reissue.

This is a divisional application of application Ser. No. 804,466, filed Mar. 5, 1969, by the same inventors, now U.S. Pat. No. 3,610,121 issued Oct. 5, 1971.

The font strip of the present invention is used with the photocomposition machine described in the aforementioned patent application. That photocomposition machine accepts justified or unjustified text in the form of coded character identification signals from any communication media such as magnetic or paper tape, wire connected keyboard, telephone line, etc., and provides an output generally of phototypeset and justified text material to be used in the printing of newspapers, books, magazines or other similar publications. The output of such a photocomposition machine may also be used for advertising, records, drawings, etc.

The techniques of photocomposition in which a character image is projected from a rapidly rotating wheel or drum through a projection lens system onto a photosensitive medium have developed into an established technology. The ever increasing use and demand for photocomposing machines has created a need for improved structure for storing the characters. Along with the increasing use of photocomposing techniques there has also been generated a need for providing an increasing number of different type fonts and character styles. The versatility of photocomposing apparatus is considerably enhanced by improved font strip structure which enables such versatility to be obtained with a minimum amount of time and with improved reliability.

A feature of the present invention relates to the positioning of the font characters on a master film strip which is accurately mounted on a font wheel by readily detachable mountings, thereby enabling a number of different type fonts to be selected as desired.

Another feature of the font strip relates to the end plates which are attached to respective ends of the font strip to engage the fastening means on the font drum or font wheel.

An additional feature is the tensioning means, which form a part of the fastening means, and maintain the proper tension of the font strip on the font drum.

A primary object of this invention is to provide a reliable low-cost and simplified font strip structure which affords readily changeable set-ups for a number of different type text setting functions.

Another object of the invention is to provide an improved structure for removably mounting a font strip to a font drum in a phototypesetting machine.

A third object is to provide a font strip mounting structure having improved durability and reliability.

These and other objects and features of the invention will become apparent in the following specification and the drawings which disclose an exemplary embodiment of the invention wherein.

ENVIRONMENT OF THE FONT STRIP

As described in the aforementioned patent application, the phototypesetting machine with which the font strip is used comprises a photo unit having three main sections, namely, a character presentation system, a projection lens assembly, and a paper advance mechanism. The character presentation system includes a continuously rotating font wheel, a Xenon flash lamp, an optical diffuser, a master font strip, and a photocell lamp assembly or font timing generator. The font strip has negative images or characters of one or more complete type fonts and is attached to the surface of the font wheel. Timing slits or marks are accurately positioned alongside the font images so that as the font wheel is rotating, the photocell assembly senses the slits to provide character alignment information to a computer to activate a Xenon flash lamp at the proper instant.

DETAILED DESCRIPTION OF FONT STRIP

Figure 1:
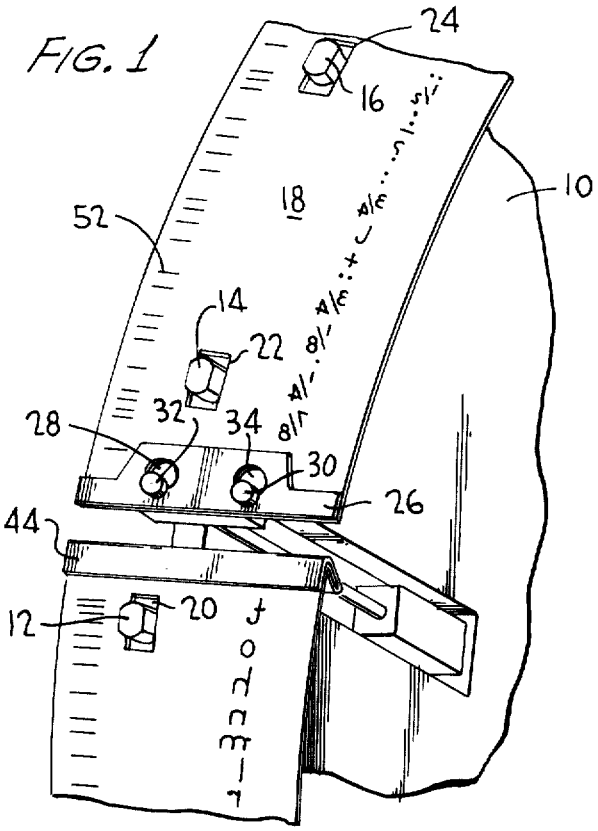
FIG. 1 is a detailed illustration of the font wheel assembly and the means for mounting the master font strip to the font wheel.
Figure 2:
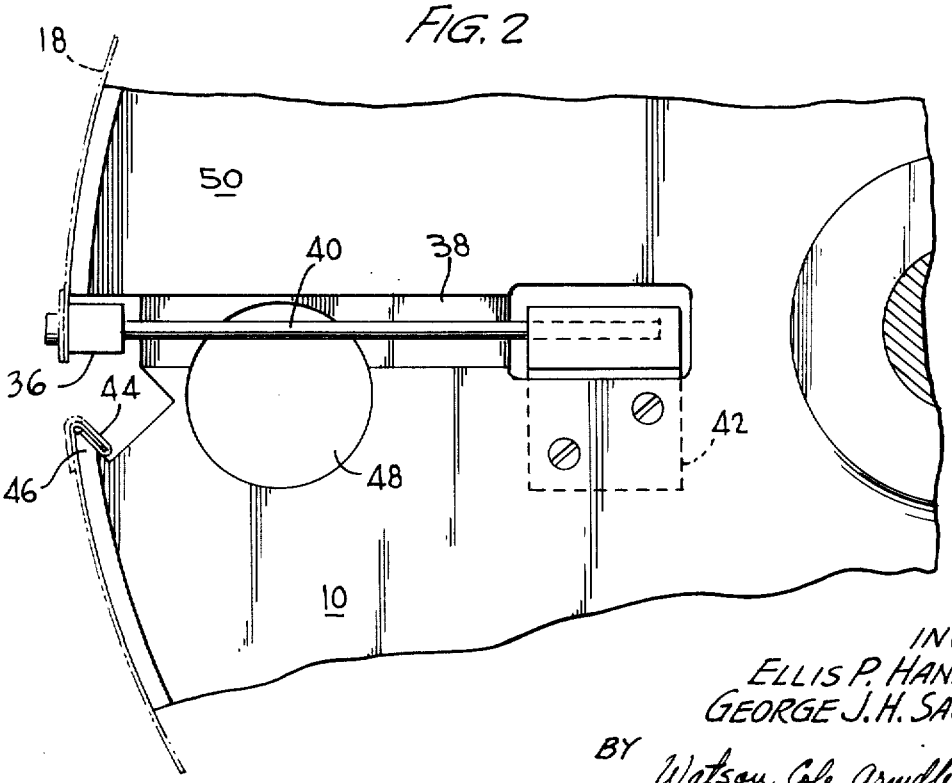
FIG. 2 is another detailed view of the font wheel and the means for securing the font tape to the wheel.

With reference to FIGS. 1 and 2, font wheel 10 includes a plurality of font strip guide posts, three of which, 12, 14 and 16, are shown in FIG. 1, for the purposes of accurately positioning font strip 18 on the outer surface of the font wheel. Guide *posts* 12, 14, 16 project through respective guide apertures 20, 22, 24 which are precisely located on font strip 18. One end of font strip 18 includes metal end plate 26 having holes 28, 30 which respectively engage securing pins 32, 34 mounted to block 36 of font strip tensioning mechanism 38. Block 36 is mounted on the free end of spring rod 40, the other end of which is mounted on font wheel 10 by bracket assembly 42.

The other end of font stip 18 includes hooked end plate 44 which engages tapered hook 46 of the font wheel. Font strip 18 is placed on the drum by engaging hooked end plate 44 with tapered hook 46, inserting the apertures in the font strip over guide posts 12, 14, 16 and then securing end plate 26 over pins 28, 30. Font strip tensioning mechanism 38 provides the necessary tension to secure the font strip to the font wheel. Finger hole 48 in flanged rim frame 50 affords a means by which spring rod 40 may be depressed to aid in engaging or disengaging pins 28, 30 from their respective apertures in end plate 26.

Figure 3:
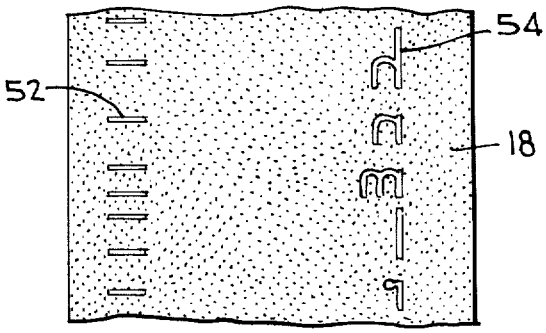
FIG. 3 is a detailed illustration of the font tape showing the photographic images of the characters and the timing slits.

Front strip 18 is preferably a strip of dimensionally stable photographic film on which have been developed negative timing marks 52 and negative type characters 54 as shown in FIGS. 1 and 3. A typical font strip will have 180 or more characters which is sufficient to provide two different fonts of type on each font strip. Timing marks 52 and type characters 54 are transparent, thereby enabling light to be projected through them. Timing marks 52 are aligned with respect to the type characters 54 so as to provide the necessary timing signals to the computer to enable a selected type character to be illuminated at the proper time and projected in the proper position on the line being set on the film as font wheel 10 rotates continuously.

The relationship of the circuitry necessary to provide the timing indications to the computer and for projecting the images from the font strip to the photographic film is described in the patent identified above.

What is claimed is:

1. [ A font strip ] *Structure* for mounting *a font strip* a frame support in phototypesetting machines, comising;

guide apertures for mounting said font strip to said frame support, negative font characters and timing slits located along respective opposite sides of said font strip in aligned relationship with respect to each other.

one end of said font strip includes means for engaging said frame support and the other end of said font strip includes end apertures, and said frame support further includes resilient means engaging said end apertures to secure said font strip to said frame support.

2. [ A font strip ] *Structure* as in claim 1 further ›mprising additional timing slits interleaved between ›id timing slits to indicate different vertical alignments ' said font characters.

3. [ A font strip ] *Structure* as in claim 2 wherein ›id timing slits are divided into two groups, one of said 'oups representing top of body alignment and the :her group representing base line alignment.

4. [ A font strip ] *Structure* as in claim 1 wherein ›id means for engaging is a hooked end clip and said ame support further includes a hooked end plate for :ceiving and retaining said hooked end clip.

5. [ A font strip ] *Structure* as in claim 4 wherein ›id one end of said font strip is folded, said hooked nd clip has a bent end portion for retaining said folded nd and attaching said font strip end to said hooked nd clip.

*6. A font strip adapted to be mounted on the rotatable ›nt wheel of a phototypesetting machine, comprising an 'ongated strip of substantially dimensionally stable ma-:rial having opposed side margins, two free ends and ›nt characters spaced along its length, fastening means t one of said free ends for attaching said one end to said ›nt wheel and including at least one aperture therein eing adapted to engage at least one post attached to said ›nt wheel, and fastening means at the other of said free nds including a bent portion forming an acute interior ngle with the remainder of said last-named fastening ›eans and adapted to engage a part of the font wheel hat forms an exterior angle substantially mating with aid acute angle, so that said font strip can be releasably ›eld on said font wheel in stable position between both aid fastening means.*

*7. A font strip as claimed in claim 6, wherein there are wo of said apertures, each engaging a respective post ›ttached to said font wheel and each being located on a lifferent side of the longitudinal axis of said font strip.*

*8. A font strip as claimed in claim 6, wherein said strip is formed with a plurality of holes spaced along its length inwardly of its side margins, said holes being adapted to engage guide posts on the font wheel for alignment of said font strip therewith.*

*9. A font strip adapted to be mounted on the rotatable font wheel of a phototypesetting machine, comprising an elongated strip of dimensionally stable photographic film having opposed side margins, two free ends and font characters spaced along its length, transparent timing slits formed in said film along respective opposite sides of said font strip in aligned relation to each other and in accurate relation to said characters to enable the characters to be photographed during rotation of the font wheel, fastening means attached to one of said free ends in the form of an end plate rigid with respect to said film and having at least one aperture extending therethrough, said aperture being adapted to engage a post attached to said font wheel, and fastening means attached to the other of said free ends in the form of an end plate rigid with respect to said film and including a bent portion forming an acute interior angle with the remainder of said last-named fastening means and adapted to engage a part of the font wheel that forms an exterior angle substantially mating with said acute angle, so that said font strip can be releasably held in stable position on said font wheel by said end plates.*

*10. A font strip as claimed in claim 9, further comprising additional timing slits interleaved between said transparent timing slits to indicate different vertical alignments of said font characters.*

*11. A font strip as claimed in claim 10, wherein said additional timing slits are divided into two groups, one of said groups representing top of body alignment and the other group representing base line alignment.*

*12. A font strip adapted to be mounted on the rotatable font wheel of a phototypesetting machine, comprising an elongated strip of substantially dimensionally stable material having opposed side margins, two free ends and font characters spaced along its length, fastening means at one of said free ends for attaching said one end to said font wheel, and fastening means at the other of said free ends in the form of a hooked end clip adapted to be received and retained by a hooked end plate on said font wheel, said other free end being folded and said hooked end clip includes a bent portion for retaining said folded end and attaching it to said hooked end clip, so that said font strip can be releasably held on said font wheel in stable position between both said fastening means.*

* * * * *